United States Patent Office 3,276,167
Patented Oct. 4, 1966

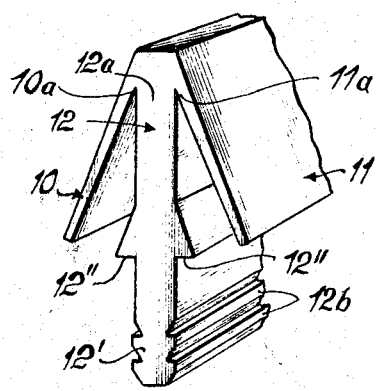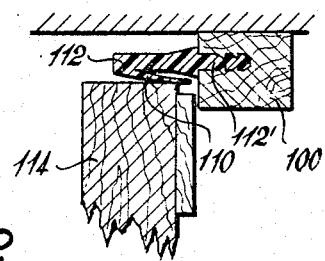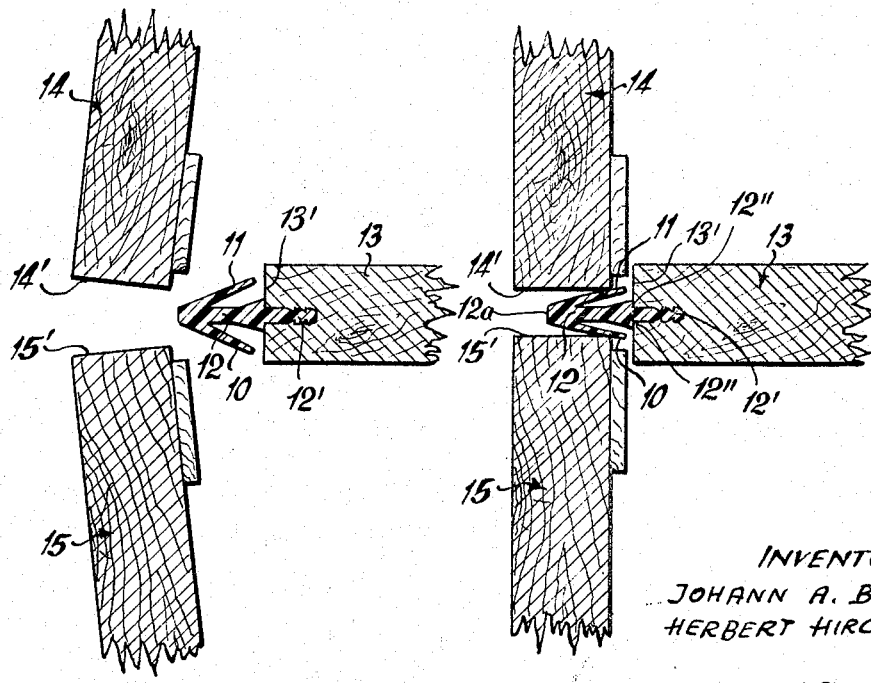

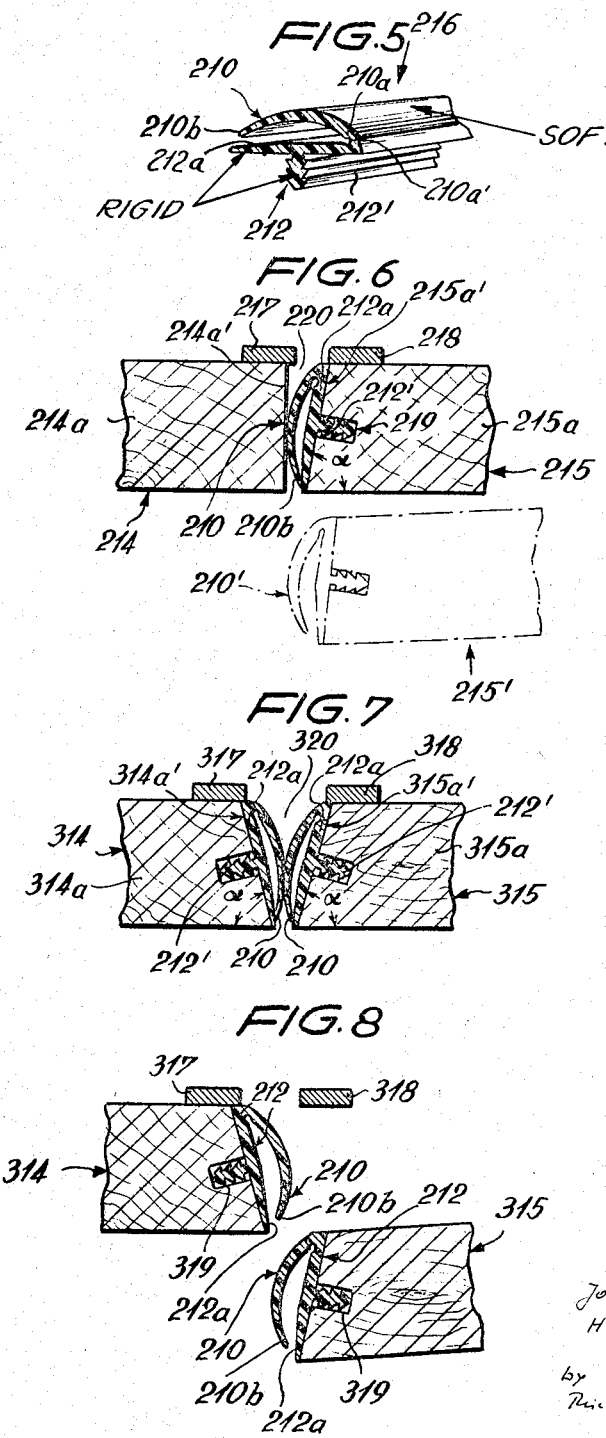

3,276,167
SEALING ELEMENT
Johann Anton Bus, Ebhausen, Wurttemberg, and Herbert Hirche, Stuttgart, Germany, assignors to Christian Holzäpfel KG., Wurttemberg, Germany
Filed June 4, 1963, Ser. No. 286,132
Claims priority, application Germany, Feb. 26, 1962, H 40,652; June 9, 1962, H 41,718
4 Claims. (Cl. 49—485)

This is a continuation-in-part of our application Serial No. 257,321, filed February 8, 1963, now abandoned.

The present invention relates to sealing elements in general, and more particularly to a dustproof, mothproof, moistureproof and soundproof sealing element for use between relatively movable parts of furniture, doors and door frames, cabinets, closets, crates, boxes and similar structures.

It is an important object of our invention to provide a very simple and inexpensive sealing element which can be mounted in stationary and/or movable component parts of aforementioned structures without necessitating any or by necessitating negligible changes in the construction and configuration of such parts.

Another object of the invention is to provide a soundproof, dustproof, mothproof and/or moistureproof sealing element which is equally useful to provide an effective seal between two movable parts, between a fixed part and a movable part, or between a fixed part and two or more movable parts.

A further object of the invention is to provide a sealing element of the above outlined characteristics which is at least partially concealed when it is put to actual use and which may provide an effective seal between parts which are not machined or mounted with utmost precision.

A concomitant object of the invention is to provide a sealing element which may cooperate with a similar sealing element to form a highly satisfactory seal between a pair of structural members.

With the above objects in view, one feature of our invention resides in the provision of a piece of furniture, such as a cabinet- or closet-like structure, which comprises a first and a second structural member each having an elongated end portion, and a sealing element which includes an elongated web having a retaining portion fixed to and preferably accommodated in a slot provided in the end portion of the first structural member. The web further includes an elongated carrier portion which extends beyond the end portion of the first structural member, and the sealing element comprises an elongated lip or flap consisting of elastic material and connected with the carrier portion of the web so that the carrier portion and the lip together form a substantially V-shaped body. One structural member is movable with respect to the other structural member between a first portion in which the end portion of the second structural member is spaced from the lip and a second position in which the end portion of the second structural member engages and deforms the lip so that the sealing element forms an effective seal between the end portions of the structural members. One of these structural members may assume the form of a door or closure which is then movable with respect to the other structural member, and it is also within the purview of our invention to form the sealing element with two lips and to anchor the web of such sealing element in a fixed structural member (e.g., in the partition of a closet) and to provide two doors or closures each of which is movable into sealing engagement with one of the lips. The sealing element may be mounted on a fixed structural member or on one or two movable structural members.

The novel features which are considered as characteristic of the invention are set forth in particular in the appended claims. The improved sealing element itself, however, both as to its construction and the method of mounting the same, together with additional features and advantages thereof, will be best understood from the following detailed description of certain specific embodiments with reference to the accompanying drawings, in which:

FIG. 1 is a perspective view of a sealing element which embodies one form of our invention;

FIG. 2 is a transverse section through a cabinet- or closet-like structure including two movable structural members and a fixed structural member which supports the sealing element, the structure being shown in closed position in which the end portions of the movable structural members engage and deform the lips of the sealing element;

FIG. 3 illustrates the structure of FIG. 2 in open position in which the end portions of the movable structural members are spaced from the respective lips;

FIG. 4 is a transverse section through a structure which includes a single movable structural member and wherein the sealing element comprises a single lip;

FIG. 5 is a fragmentary perspective view of a third sealing element which comprises a sickle-shaped lip;

FIG. 6 is a transverse section through a pair of movable structural members one of which carries a sealing element of the type shown in FIG. 5, this one structural member being also shown in a second position (in phantom lines) in which the sickle-shaped lip of its sealing element is spaced from the other structural member;

FIG. 7 is a transverse section through a further structure which is shown in closed position and wherein each of two cooperating movable structural members carries a sealing element of the type shown in FIG. 5; and FIG. 8 is a section similar to the one shown in FIG. 7 but with one of the structural members moved to open position in which the sickle-shaped lips of the cooperating sealing elements are spaced from each other.

Referring now in greater detail to the drawings, and first to FIG. 1, there is shown a sealing element which comprises an elongated web 12 having an elongated carrier portion 12a which is integral with the adjacent edge portions 10a, 11a of two elongated lips or flaps 10, 11. The lips consist of elastically deformable flexible material having the characteristics of rubber and are disposed mirror symmetrically at the opposite sides of the web 12. As shown, the lips diverge from the carrier portion 12a to the retaining portion 12′ of the web so that each lip forms with the carrier portion a substantially V-shaped body. The thickness of each lip diminishes gradually in a direction toward its free edge portion, i.e., downwardly and away from the edge portions 10a, 11a as viewed in FIG. 1. The retaining portion 12′ extends beyond the free ends of the lips and is formed with external ribs 12b which facilitate anchoring of the web in a structural member, for example, in a manner as shown in FIGS. 2 and 3. In the embodiment of FIG. 1, the web 12 is integral with the lips 10, 11 and its thickness exceeds the thickness of the lips so that it is stiffer and more resistant to deformation. A medium portion of the web is formed with a longitudinally extending boss which defines two shoulders 12″ to serve as a means for determining the extent to which the retaining portion 12′ may be anchored in a structural member. This boss also stiffens the web and enables the latter to offer greater resistance to stresses which tend to bend it in a direction to the left or to the right, as viewed in FIG. 1. It will be noted that the retaining portion 12' is substantially coplanar with the carrier portion 12a so that the web 12 assumes the form of an elongated strip.

Referring to FIGS. 2 and 3, there is shown a cabinet- or closet-like structure which embodies the sealing element of FIG. 1. This structure comprises a fixed structural member 13 which constitutes a partition in a closet or in a cabinet and whose left-hand end portion 13' extends in the longitudinal direction of the shoulders 12". The retaining portion 12' is anchored in a slot provided in the end portion 13' so that the carrier portion 12 extends beyond and is spaced from the end face of the portion 13'. The additional structural members 14, 15 of the structure shown in FIGS. 2 and 3 constitute two doors or closures each of which is movable between the closed position of FIG. 2 and the open position of FIG. 3. When the doors 14, 15 are closed, the end faces of their end portions 14', 15' respectively engage and deform the lips 11, 10 so that the sealing element consisting of the web 12 and lips 10, 11 forms an effective seal between the end portions 13', 14', 15'. The lips 10, 11 are permitted to return to their undeformed positions as soon as the doors 14, 15 move to or beyond the positions of FIG. 3. It will be noted that the doors 14, 15 need not be formed with sealing strips, cords, battens, fillets or similar sealing devices because the lips 10, 11 and the web 12 form a very effective sealing element which is noiseless and which prevents entry of moisture, dirt or other foreign matter when the doors are closed. The retaining portion 12' may be coated with a suitable adhesive to insure that it is safely anchored in the end portion 13'.

The material of the sealing element may be natural rubber, synthetic rubber or any other synthetic plastic material which exhibits the characteristics of rubber.

All that is necessary to mount the sealing element of FIG. 1 in the structural member 13 of FIGS. 2 and 3 is to form a groove or slot in the end face of the portion 13' and to coat the retaining portion 12' with a suitable adhesive which provides a satisfactory bond between the material of the web 12 and the material of the structural member 13. The shoulders 12" limit the extent to which the retaining portion 12' may penetrate into the slot, and these shoulders also insure that the end portion 13' cannot interfere with movements of the lips toward and away from the web 12.

As shown in FIG. 4, the sealing element of our invention may be used in pieces of furniture or similar structure wherein a single movable structural member may be caused to change its position with respect to a fixed structural member. In such construction, one of the lips may be omitted and, if desired, the web of the sealing element may be reinforced by a stiffening plate or the like to resist deformation when the remaining lip is flexed by the movable structural member. FIG. 4 illustrates a sealing element including a single lip 110 which is integral with a web 112. The web 112 is mounted in a fixed structural member 100 and the lip 110 may be engaged by a movable strucural member 114. The manner in which the retaining portion 112' of the web 112 is anchored in the fixed structural member 100 is the same as shown in FIGS. 2 and 3.

FIG. 5 illustrates a sealing element which comprises a substantially T-shaped elongated web 212 including a ribbed retaining portion 212' and a smooth-surfaced carrier portion 212a. In accordance with a more specific feature of our invention, the thickness of the carrier portion 212a may diminish in a direction from the one toward the other of its longitudinally extending edges. As shown, the carrier portion 212a has a right-hand zone of constant thickness and a left-hand zone of gradually diminishing thickness. The thicker edge of the carrier portion 212a is integral with the edge portion 210a of a sickle-shaped lip or flap 210 which is adjacent to the outer side of the carrier portion and whose thickness diminishes in a direction away from the thicker edge of the carrier portion. Such configuration insures that the lip 210 is readily deformable so that its curvature is reduced and that its inner side moves closer to the outer side of the carrier portion 212a whenever the outer side of the lip is subjected to deforming stresses acting in the direction indicated by an arrow 216. In fact, the deformability of the lip 210, or rather its deflection in direction of the arrow 216, may be further enhanced by providing a longitudinally extending groove 210a' in the edge portion 210a of lip 210. The sealing element of FIG. 5 consists of rubber or synthetic thermoplastic material.

FIG. 6 shows two movable structural members in the form of swingable doors 214, 215 which may be moved to closed positions so as to respectively abut against stationary stops 217, 218. The longitudinally extending end portions 214a, 215a of these movable members are formed with flat end faces 214a', 215a' which define between themselves a narrow gap 220 when the members 214, 215 assume the full-line positions of FIG. 6. This gap must be closed by the sealing element of FIG. 5. As shown, the end face 215a' is formed with a centrally located elongated slot 219 which receives the retaining portion 212' whereby the carrier portion 212a extends along and conceals the end face 215a'. The curvature of the lip 210 is selected in such a way that the lip is deformed when the end portions 214a, 215a respectively abut against the stops 217, 218.

When the structural member 215 is caused to assume its open position 215' (shown in phantom lines), the lip 210 assumes the position 210' because it is moved out of contact with the end face 214a'. Of course, the user may decide to open the member 214 and to leave the member 215 in abutment with the stop 218.

The retaining portion 212' is coated with a suitable adhesive which forms a strong bond with the material of the member 215. It is advisable to provide a layer of adhesive between the end face 215a' and the adjacent surface of the carrier portion 212a. The lip 210 may be made softer (i.e., more elastic) than the web 212 so that the latter will form a rigid support for the lip.

The end face 214a' is substantially perpendicular to the general plane of the structural member 214. However, the end face 215a' preferably makes an acute angle with the end face 214a' so that the width of the gap 220 increases in a direction toward the stops 217, 218. For example, the angle alpha between the end face 215a' and the general plane of the structural member 215 be about 75°. By properly selecting the curvature of the lip 210 and by keeping the width of the gap 220 within a certain range, we insure that the free edge portion 210b of the lip 210 abuts against the carrier portion 212a when the members 214, 215 assume the full-line positions of FIG. 6. The median zone of the lip 210 is then flattened by the end face 214a' so that the lip is in a face-to-face (rather than in a mere linear) contact with the end portion 214a.

The main difference between the structure of FIG. 6 and the structures of FIGS. 2 to 4 is that the sealing element 210–212 is fixed to a movable structural member so that it may be swung with respect to the other structural member. Of course, the member 215 may be fixed to the stop 218 without departing from the spirit of our invention since the member 214 may be pivoted toward and away from the stop 217 irrespective of the position of the member 215.

Referring finally to FIGS. 7 and 8, there is shown an assembly including two movable structural members 314, 315 which may be swung into abutment with (FIG. 7) or away from (FIG. 8) a pair of fixed stops 317, 318. The end portions 314a, 315a of these structural members have inclined end faces 314a', 315a' and each end portion carries a sealing element of the type shown in FIG. 5. The retaining portions 212' of the webs 212 are anchored in slots 319 provided in the end faces 314a', 315a' and these end faces are bonded to the respective carrier portions 212a.

When the structural members 214, 215 assume the positions of FIG. 7, the lips 210 abut against each other and undergo such deformation as is necessary to insure that the gap 320 is properly sealed against the passage of dust or moisture. The angles alpha may be of the same magnitude as described in connection with FIG. 6. In this embodiment, the one or the other sealing element may be considered to constitute a component part of the respective end portion 314a or 315a.

When the member 315 assumes the open position of FIG. 8, the edge portions 210b of the lips 210 are free to move away from the respective carrier portions 212a. The structure of FIGS. 7 and 8 may form part of a cabinet or closet wherein the structural members 314, 315 constitute two swingable doors.

We have found that the sealing element of our invention is especially useful as a seal between the parts of cabinets or closets, and that its lip or lips form a highly satisfactory barrier against entry of dust, moisture and moths. Furthermore, the sealing elements are at least partially concealed between the end portions of the cooperating structural members and their webs may compensate for any inaccuracies in the machining and/or mounting of the structural members. Thus, even if the width of a gap between the end portions of cooperating structural members varies within a given range, the lips will still engages the end portions of the adjacent members to form a satisfactory seal.

The sealing element may be used not only between a partition and the door or doors of closets and similar structures but also between the bottom wall and the door or doors of a closet, between the top wall and the door or doors of a closet, between the fixed walls and the drawer of a piece of furniture, between the door frame and the door, and in many other types of structures.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a structure of the character described, in combination, a first and a second structural member each having an elongated end portion and each of said end portions having an end face, one of said structural members being movable with respect to the other structural member between a closed position in which said end faces are adjacent to but slightly spaced from each other to form a narrow gap and an open position in which said end faces are more distant from each other, said end faces being inclined with reference to each other when said one structural member assumes said closed position; and an elongated sealing element comprising a web including a retaining portion anchored in the end portion of said first structural member and a carrier portion substantially coextensive with and extending beyond the end face of said first structural member, and a sickle-shaped elongated sealing lip of deformable elastic material, said lip being interal with said carrier portion so that said web forms a rigid support for said lip, and being deformed by the end face of the second structural member when said one structural member assumes said closed position.

2. In a structure of the character described in claim 1, said sickle-shaped elongated sealing lip consisting of deformable elastic material which is softer than the material of said web.

3. In a structure of the character described, in combination, a first and a second structural member each having an elongated end portion and each of said end portions having an end face, one of said structural members being movable with respect to the other structural member between a closed position in which said end faces are adjacent to but slightly spaced from each other to form a narrow gap and an open position in which said end faces are more distant from each other; and an elongated sealing element comprising a web including a retaining portion anchored in the end portion of said first structural member and a carrier portion extending along and being coextensive with the end face of said first structural member, said carrier portion having a pair of spaced edge portions, a first zone of constant thickness adjacent to one of said edge portions and a second zone whose thickness diminishes in a direction from said first zone toward the other edge portion thereof, and a sickle-shaped elongated sealing lip of deformable elastic material, said lip having an inner face facing said carrier portion and further having an edge portion integral with said one edge portion of said carrier portion so that said web forms a rigid support for said lip, said inner face of said lip being provided with a groove extending in longitudinal direction adjacent said one edge portion, and said lip being deformed by the end face of the second structural member when said one structural member assumes said closed position.

4. In a structure of the character described in claim 3, said sickle-shaped elongated sealing lip consisting of deformable elastic material which is softer than the material of said web.

References Cited by the Examiner

UNITED STATES PATENTS

| 1,948,017 | 2/1934 | Weubling | 20—68 |
|---|---|---|---|
| 2,132,060 | 10/1938 | Tremblay | 20—69 |
| 2,140,844 | 12/1938 | Mirus-Leuschner | 20—69 |
| 2,158,808 | 5/1939 | Wetzel | 20—69 X |
| 2,345,273 | 3/1944 | Macklanburg | 20—69 |
| 2,546,049 | 3/1951 | Weaver et al. | 20—69 |
| 2,584,089 | 1/1952 | Hillenbrand et al. | 312—296 X |
| 2,716,787 | 9/1955 | Harris | 20—69 |
| 2,896,276 | 7/1959 | Read et al. | 20—69 |
| 3,070,852 | 1/1963 | Hilliker | 20—69 X |
| 3,153,265 | 10/1964 | Hosea et al. | 20—69 |

FOREIGN PATENTS

| 102,938 | 1/1938 | Australia. |
|---|---|---|
| 1,040,855 | 10/1953 | France. |
| 1,137,851 | 10/1962 | Germany. |
| 686,277 | 1/1953 | Great Britain. |

HARRISON R. MOSELEY, *Primary Examiner.*

W. E. HEATON, *Assistant Examiner.*